(12) United States Patent
Yoon

(10) Patent No.: US 12,247,652 B2
(45) Date of Patent: Mar. 11, 2025

(54) ASSEMBLY STRUCTURE OF DUST CAP AND STEERING DEVICE INCLUDING THE SAME

(71) Applicant: HL MANDO CORPORATION, Pyeongtaek-si (KR)

(72) Inventor: Hwasick Yoon, Yongin-si (KR)

(73) Assignee: HL MANDO CORPORATION, Pyeongtaek-si (KR)

( * ) Notice: Subject to any disclaimer, the term of this patent is extended or adjusted under 35 U.S.C. 154(b) by 20 days.

(21) Appl. No.: 18/196,790

(22) Filed: May 12, 2023

(65) Prior Publication Data
US 2023/0400090 A1   Dec. 14, 2023

(30) Foreign Application Priority Data
Jun. 10, 2022   (KR) .................... 10-2022-0070853

(51) Int. Cl.
| | |
|---|---|
| *F16H 57/029* | (2012.01) |
| *B62D 3/12* | (2006.01) |
| *F16H 57/00* | (2012.01) |
| *F16H 57/028* | (2012.01) |
| *F16H 57/02* | (2012.01) |

(52) U.S. Cl.
CPC ............ *F16H 57/029* (2013.01); *B62D 3/12* (2013.01); *B62D 3/126* (2013.01); *F16H 57/0006* (2013.01); *F16H 57/028* (2013.01); *B60Y 2306/09* (2013.01); *B60Y 2410/10* (2013.01); *F16H 2057/02013* (2013.01); *F16H 2057/02082* (2013.01); *Y10T 74/1967* (2015.01)

(58) Field of Classification Search
CPC .... F16H 57/029; F16H 57/0006; F16H 57/00; F16H 57/02; F16H 57/028; F16H 2057/02013; F16H 2057/02082; B62D 3/12; B62D 3/126; B62D 1/20; B62D 5/22; B60Y 2306/09; B60Y 2410/10; Y10T 74/1967
USPC .................. 180/84; 280/847, 93.515; 74/422
See application file for complete search history.

(56) References Cited

U.S. PATENT DOCUMENTS

| | | | | |
|---|---|---|---|---|
| 11,428,273 | B2 * | 8/2022 | Oh ......................... | F16D 3/223 |
| 2006/0108782 | A1 * | 5/2006 | Kanazawa ............... | F16J 15/50 |
| | | | | 280/779 |

(Continued)

FOREIGN PATENT DOCUMENTS

| | | |
|---|---|---|
| EP | 3693248 A1 | 8/2020 |
| JP | 5898538 B2 | 4/2016 |

(Continued)

*Primary Examiner* — Keith J Frisby
(74) *Attorney, Agent, or Firm* — Hauptman Ham, LLP

(57) ABSTRACT

Disclosed herein is an assembly structure of a dust cap being coupled to an assembly part of a rack housing which is open such that a steering shaft is inserted therethrough, wherein the dust cap includes a body provided in a hollow tube shape through which the steering shaft passes, a first coupling portion bent to extend outward from the body and press-fitted onto an outer circumferential surface of the assembly part, and a second coupling portion provided to be spaced a certain interval from the first coupling portion and inserted into the assembly part, and the second coupling portion is provided such that, when assembled to the assembly part, a gap is formed between the second coupling portion and an inner surface of the assembly part.

17 Claims, 14 Drawing Sheets

(56) References Cited

U.S. PATENT DOCUMENTS

2016/0339942 A1* 11/2016 Kim .......................... B22C 9/24
2021/0156417 A1* 5/2021 Escobar ................. F16J 15/447

FOREIGN PATENT DOCUMENTS

| JP | 2017136955 A | * | 8/2017 |
| JP | 6799306 B2 | | 12/2020 |
| KR | 20080104800 A | * | 12/2008 |
| KR | 10-2014-0022145 A | | 2/2014 |
| KR | 20150017627 A | * | 2/2015 |
| KR | 20160049279 A | * | 5/2016 |

* cited by examiner

ASSEMBLY STRUCTURE OF DUST CAP AND STEERING DEVICE INCLUDING THE SAME

CROSS-REFERENCE TO RELATED APPLICATION

This application claims the benefit of Korean Patent Application No. 10-2022-0070853, filed on Jun. 10, 2022 in the Korean Intellectual Property Office, the disclosure of which is incorporated herein by reference.

BACKGROUND

1. Field

Embodiments of the present disclosure relate to an assembly structure of a dust cap and a steering device including the same, and more particularly, to an assembly structure of a dust cap capable of preventing the dust cap from being tilted from a rack housing and also reducing noise, and a steering device including the same.

2. Description of the Related Art

In general, steering devices are devices which allow a driver to change a traveling direction of a vehicle according to a driver's intention and also devices which allow a driver to drive a vehicle in a direction desired by the driver by arbitrarily changing a rotation center about which a vehicle wheel turns.

In such a steering device of a vehicle, a steering force generated by the operation of a steering wheel by a driver is transmitted to a rack pinion mechanism through a steering shaft to ultimately change directions of both wheels.

For example, a rack pinion steering device is disclosed in Korean Patent No. According to Korean Patent No. 10-2014-0022145, the steering device includes a steering shaft coupled to a steering wheel disposed in front of a driver, a pinion gear formed at an end portion of the steering shaft, a rack bar provided in a rack housing to convert a rotational force input from the steering shaft (pinion gear) into a linear motion, and a dust cap of which one side is coupled to the rack housing and the other side is coupled to a dash panel.

The dust cap is provided to surround the steering shaft and is press-fitted onto an outer circumferential surface of an assembly part of the rack housing into which the steering shaft is inserted.

However, when a vehicle is operated, as a compression load is applied to the dust cap through the dash panel, a tilting phenomenon occurs in which the dust cap is tilted from the rack housing. Therefore, there is a problem that squeak noise is generated due to misalignment between an axial center of the dust cap and a compression load direction of the dash panel.

In addition, there is a problem that a steering feeling is degraded due to contact between the dust cap and the steering shaft, and in serious cases, there is a problem that steering is impossible.

Furthermore, there is a problem that, due to the tilting of the dust cap, external moisture or foreign materials enter the rack housing, which corrodes a gear provided inside the rack housing.

SUMMARY

Therefore, it is an aspect of the present disclosure to provide an assembly structure of a dust cap capable of preventing the dust cap from being tilted from a rack housing through a simple structure, and a steering device including the same.

It is another aspect of the present disclosure to provide an assembly structure of a dust cap capable of preventing noise due to contact between a dust cap and a rack housing, and a steering device including the same.

Additional aspects of the disclosure will be set forth in part in the description which follows and, in part, will be obvious from the description, or may be learned by practice of the disclosure.

In accordance with one aspect of the present disclosure, an assembly structure of a dust cap is coupled to an assembly part of a rack housing which is open such that a steering shaft is inserted therethrough, wherein the dust cap includes a body provided in a hollow tube shape through which the steering shaft passes, a first coupling portion bent to extend outward from the body and press-fitted onto an outer circumferential surface of the assembly part, and a second coupling portion provided to be spaced a certain interval from the first coupling portion and inserted into the assembly part, and the second coupling portion is provided such that, when assembled to the assembly part, a gap is formed between the second coupling portion and an inner surface of the assembly part.

The body, the first coupling portion, and the second coupling portion may be integrally formed as one body, and the second coupling portion may be provided to have a longer length than the length of the first coupling portion.

A sealing member may be provided between the first coupling portion and the assembly part, and a sealing groove into which the sealing member is fitted may be formed in the first coupling portion or the assembly part.

The assembly part may include an insertion portion provided such that an inner diameter thereof gradually decreases from an upper portion to a lower portion thereof, and a mounting portion extending vertically from a lower end of the insertion portion.

The mounting portion may be formed to protrude in an inner radial direction.

The second coupling portion may further include a rib formed to protrude outward.

The rib may be provided to have a thickness corresponding to an interval of the gap so that the second coupling portions may be press-fitted onto the inner surface of the assembly part.

The rib may be formed to extend in a longitudinal direction of the second coupling portion and provided as a plurality of ribs spaced a certain interval from each other along an outer circumferential surface of the second coupling portion.

The rib may be press-fitted into the mounting portion.

The rib may be provided to have a length corresponding to a length of the mounting portion.

The second coupling portion may include a locking protrusion protruding in a radial direction from a lower end portion thereof, and the mounting portion may have a locking groove which is formed at a portion corresponding to the locking protrusion and into which the locking protrusion is fitted and coupled when the second coupling portion is assembled.

The second coupling portion may have a slit formed by cutting the second coupling portion in a longitudinal direction thereof.

The slit may be formed by cutting the second coupling portion together with the locking protrusion.

The slit may be provided as a plurality of slits spaced a certain interval from each other along an outer circumferential surface of the second coupling portion.

The second coupling portion may further include a tilt preventing protrusion portion formed to protrude outward, and the mounting portion may have a tilt preventing groove portion into which the tilt preventing protrusion portion is inserted.

The protrusion may be provided as a plurality of tilt preventing protrusion portions spaced a certain interval from each other along an outer circumferential surface of the second coupling portion.

The tilt preventing protrusion portion may be provided in a polygonal shape, a circular shape, an elliptical shape, or the like, and the tilt preventing groove portion may have a shape which accommodates the tilt preventing protrusion portion and in which a portion of the tilt preventing protrusion portion is supported in surface contact therewith.

The assembly part may further include a flange protruding from an outer surface thereof, and an upper end of the flange may be provided to support a lower end of the first coupling portion.

The first coupling portion may further include an insertion protrusion at a lower edge thereof, and the flange may have an insertion groove into which the insertion protrusion is inserted.

In accordance with another aspect of the present disclosure, a steering device includes a rack housing including an assembly part which is formed to extend upward from a body, in which a rack bar is accommodated, and is open such that a steering shaft is inserted therethrough, and the above-described assembly structure of a dust cap.

BRIEF DESCRIPTION OF THE DRAWINGS

These and/or other aspects of the disclosure will become apparent and more readily appreciated from the following description of the embodiments, taken in conjunction with the accompanying drawings of which.

DETAILED DESCRIPTION

Figure 1:
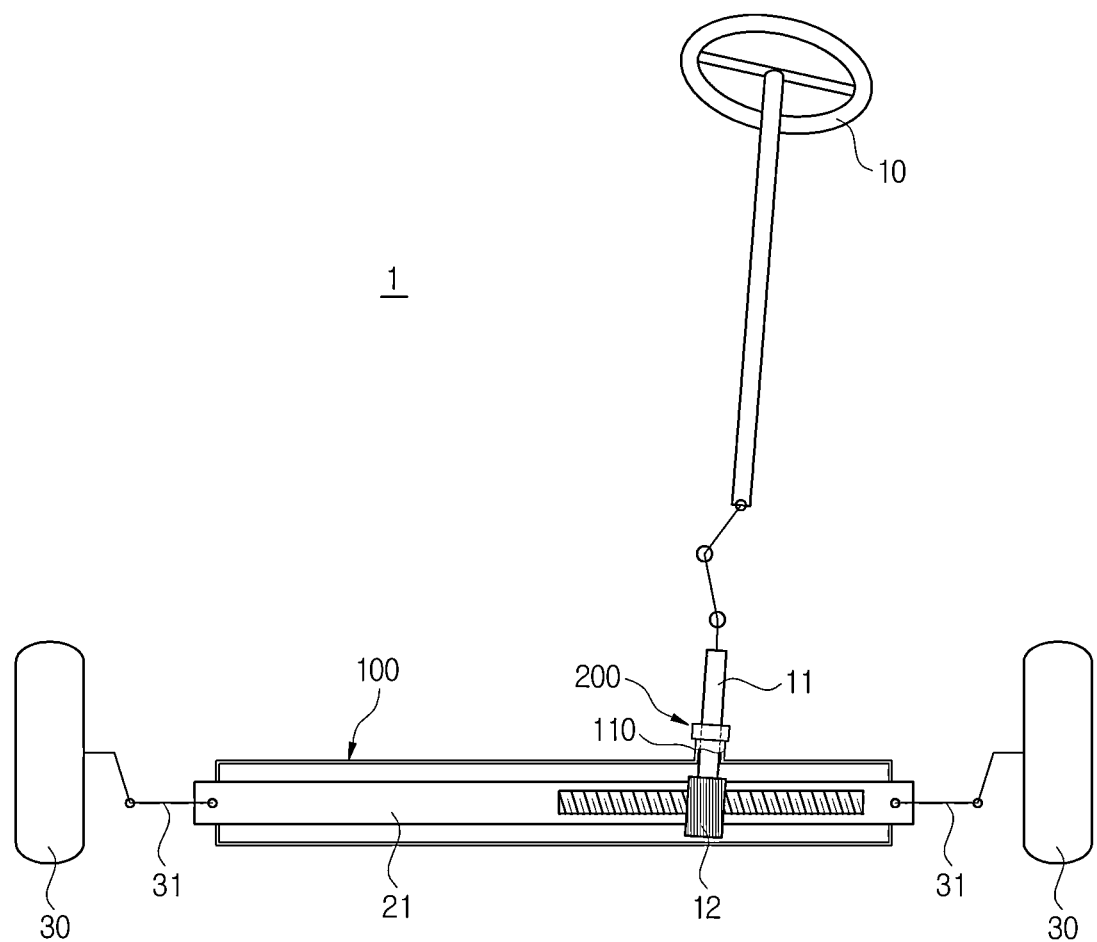
FIG. 1 is a schematic view illustrating a steering device to which an assembly structure of a dust cap is applied according to an embodiment of the present disclosure.

Hereinafter, embodiments of the present disclosure will be described in detail with reference to the accompanying drawings. Embodiments described below are exemplarily provided to sufficiently inform those skilled in the art of the spirit of the present disclosure. Rather than being limited to the embodiments described below, the present disclosure may be implemented in other forms. In the drawings, parts that are irrelevant to the descriptions may be not shown in order to clarify the present disclosure, and also, for easy understanding, the sizes of components are more or less exaggeratedly shown.

Figure 2:
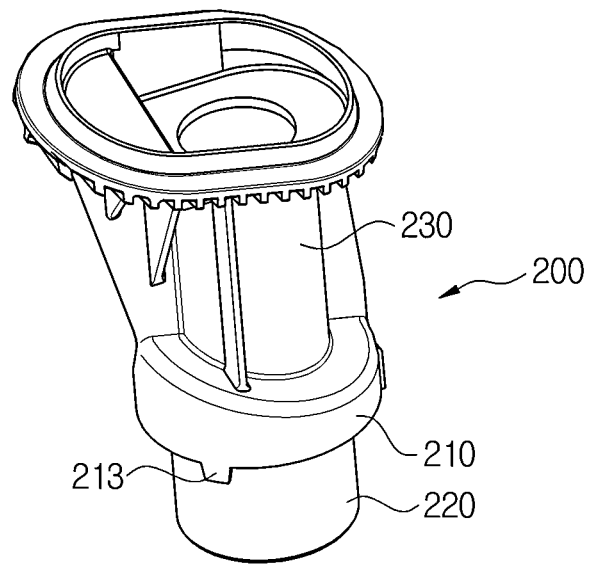
FIG. 2 is an exploded perspective view of an assembly structure of a dust cap according to an embodiment of the present disclosure.
Figure 2:
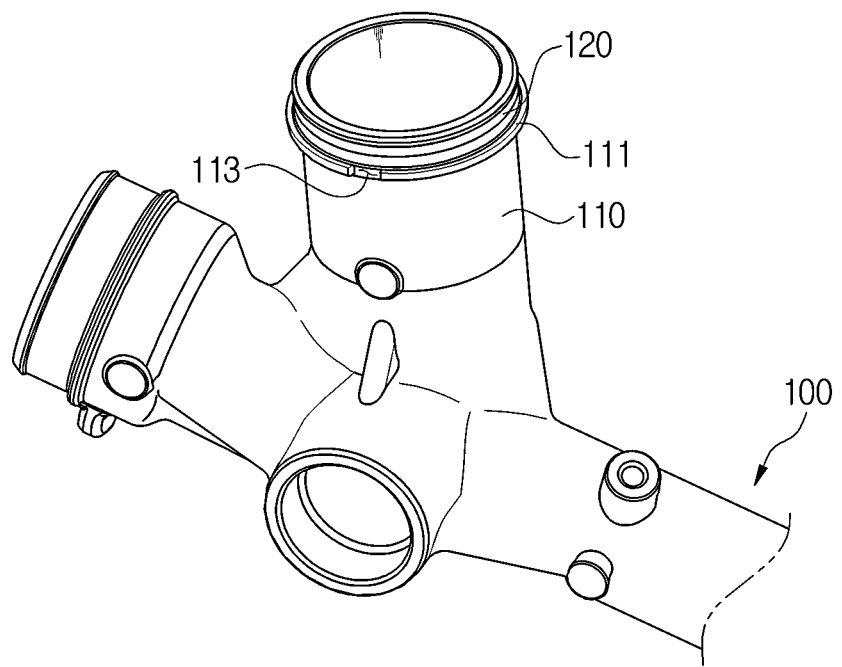
Figure 3:
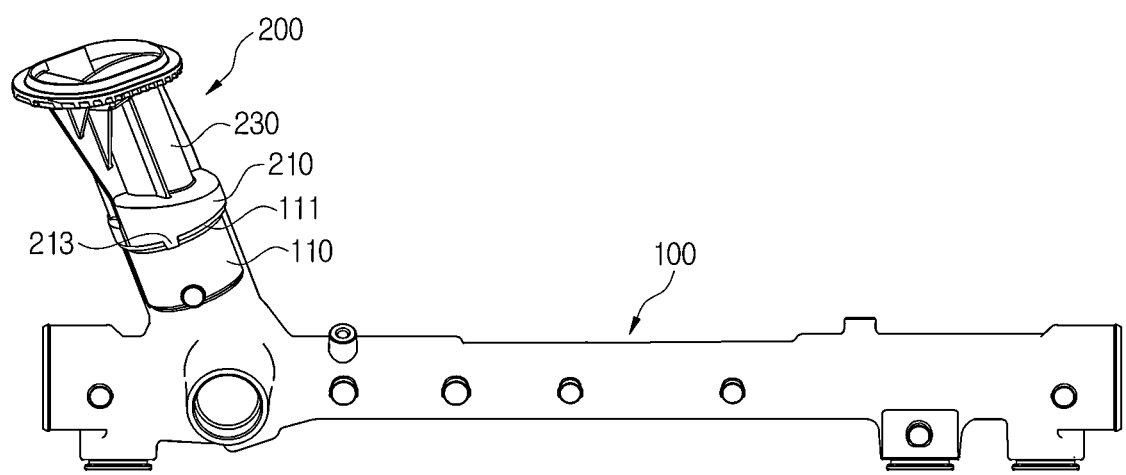
FIG. 3 is a front view illustrating a state in which a dust cap and a rack housing are coupled according to an embodiment of the present disclosure.
Figure 4:
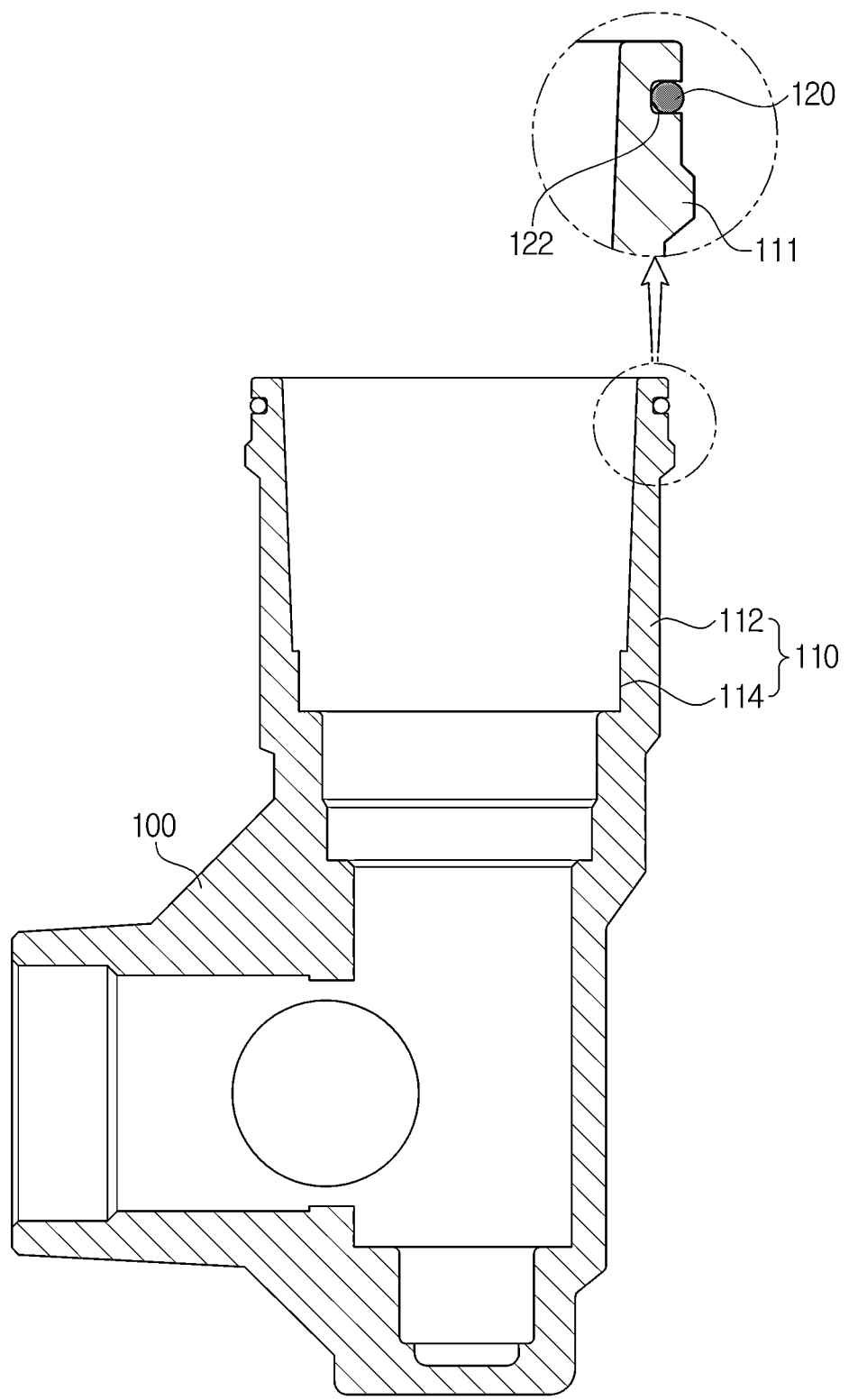
FIG. 4 is a cross-sectional view illustrating an assembly part of the rack housing provided in the assembly structure of a dust cap according to an embodiment of the present disclosure.
Figure 5:
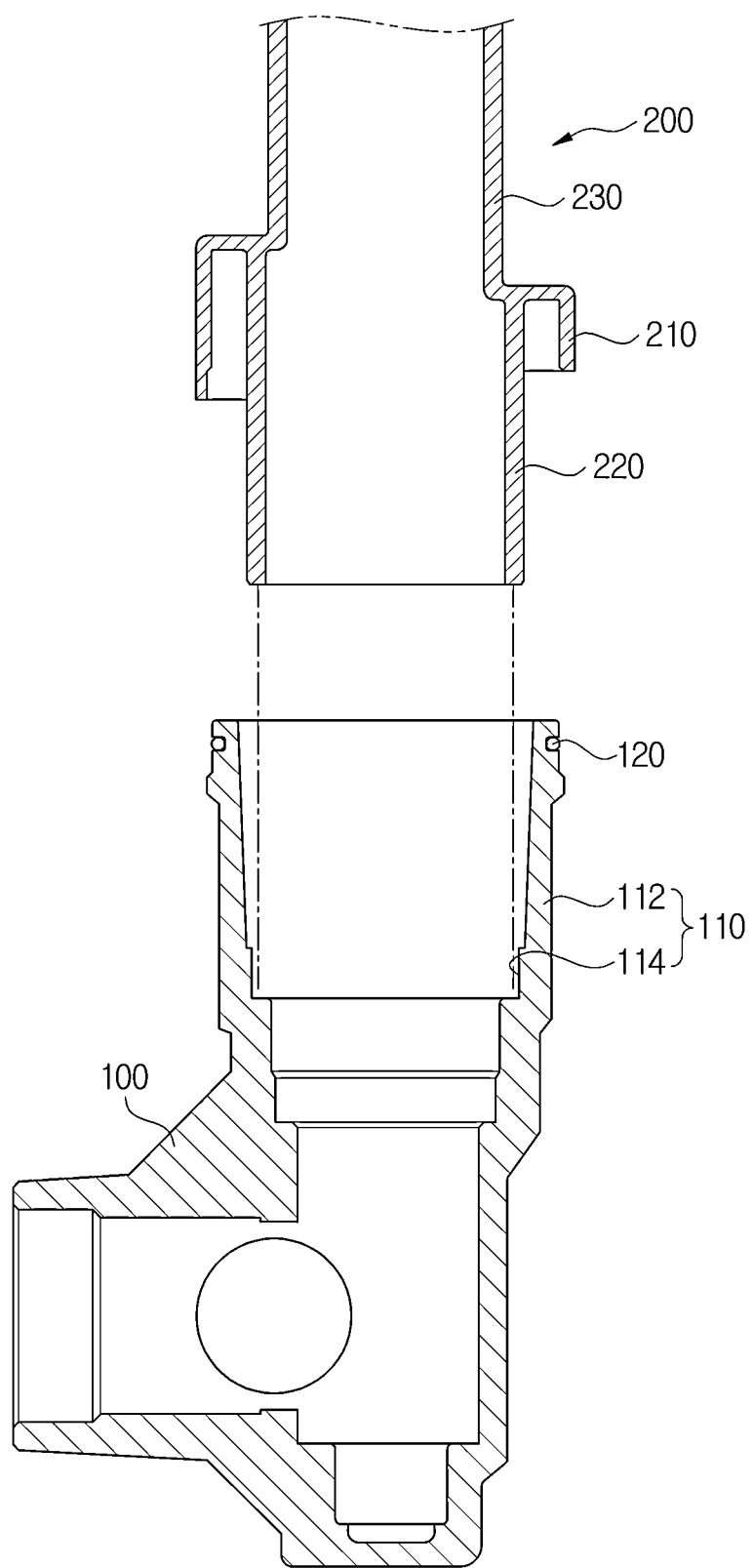
FIG. 5 is a cross-sectional view illustrating an assembled state of the assembly structure of a dust cap according to an embodiment of the present disclosure.
Figure 6:
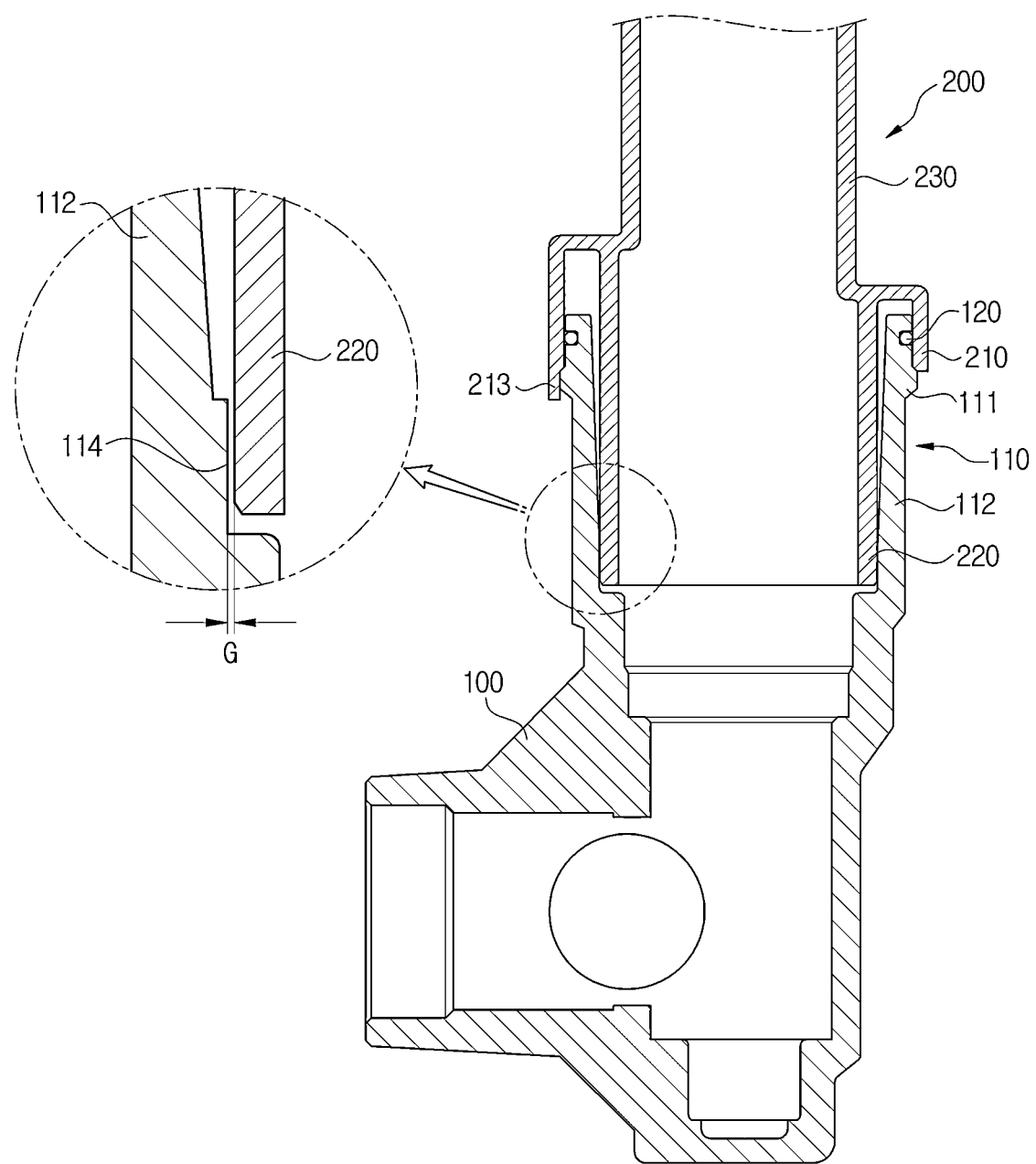
FIG. 6 is an assembly cross-sectional view of FIG. 5.

FIG. 1 is a schematic view illustrating a steering device to which an assembly structure of a dust cap is applied according to an embodiment of the present disclosure. FIG. 2 is an exploded perspective view of an assembly structure of a dust cap according to an embodiment of the present disclosure. FIG. 3 is a front view illustrating a state in which a dust cap and a rack housing are coupled according to an embodiment of the present disclosure. FIG. 4 is a cross-sectional view illustrating an assembly part of the rack housing provided in the assembly structure of a dust cap according to an embodiment of the present disclosure. FIG. 5 is a cross-sectional view illustrating an assembled state of the assembly structure of a dust cap according to an embodiment of the present disclosure. FIG. 6 is an assembly cross-sectional view of FIG. 5.

Referring to FIGS. 1 to 6, a steering device 1 includes a steering shaft 11 coupled to a steering wheel 10, a rack bar 21 for converting a rotational force input from the steering shaft 11 into a linear motion, and a rack housing 100 for accommodating portions of the rack bar 21 and the steering shaft 11. In this case, wheels 30 are connected through tie rods 31 and knuckle arms connected to both end portions of the rack bar 21.

Therefore, the rotational force generated by the rotation of the steering wheel is transmitted to the rack bar 21 through a pinion gear 12 provided in the steering shaft 11, and as the rack bar 21 laterally reciprocates by the rotation of the steering shaft 11, a direction of the wheels are changed to steer a vehicle.

The steering device 1 further includes a dust cap 200 coupled onto the rack housing 100 to prevent foreign materials such as dust or water from entering the rack housing 100.

Meanwhile, the rack housing 100 includes an assembly part 110 to be assembled with the dust cap 200. The assembly part 110 is formed to extend upward from a body in which the rack bar 21 is accommodated and is formed to be open such that the steering shaft 11 is inserted therethrough.

More specifically, the assembly part 110 may include an insertion portion 112 provided such that an inner diameter thereof gradually decreases from an upper portion to a lower portion thereof and a mounting portion 114 extending vertically from a lower end of the insertion portion 112. Here, the mounting portion 114 may be formed to protrude in an inner radial direction.

In addition, the assembly part 110 further includes a flange 111 formed to protrude from an outer surface thereof. The flange 111 is provided to support a lower end of a first coupling portion 210 of the dust cap 200 to be described below. In addition, an insertion groove 113 may be formed in the flange 111 such that an insertion protrusion 213 formed in the first coupling portion 210 is inserted therein.

The steering shaft 11 is coupled to the rack bar 21 through the assembly part 110, and the dust cap 200 is fitted onto the steering shaft 11 and coupled to the assembly part 110. Although not shown, an upper end portion of the dust cap 200 is installed on a dash panel.

The upper end portion of the dust cap 200 is fixed to the dash panel, and a lower end portion thereof is installed in the rack housing 100 so that the dust cap 200 serves to block noise or the like from flowing into an interior through an engine room and also prevent foreign materials from flowing into the rack housing 100. The dust cap 200 includes a body 230 provided in a hollow tube shape through which the steering shaft 11 passes through, the first coupling portion 210 bent to extend outward from the body 230 and coupled to the assembly part 110, and a second coupling portion 220 provided to be spaced a certain interval from the first coupling portion 210.

The body 230, the first coupling portion 210, and the second coupling portion 220 may be integrally formed as one body.

The first coupling portion 210 may be press-fitted onto an outer circumferential surface of the assembly part 110. In this case, a sealing member 120 may be provided between the first coupling portion 210 and the assembly part 110. As shown in the drawings, a sealing groove 122 to which the sealing member 120 is inserted and coupled may be formed in the assembly part 110. Accordingly, the first coupling portion 210 is press-fitted onto the assembly part 110 and sealed by the sealing member 120, thereby preventing foreign materials from flowing into the rack housing 100.

Meanwhile, although the sealing member 120 is shown and described as being fitted and assembled into the sealing groove 122 of the assembly part 110, the present disclosure is not limited thereto. A sealing groove may be formed such that the sealing member 120 is installed on the first coupling portion 210 so that the sealing member 120 may press-fitted onto the assembly part 110.

In a state in which the first coupling portion 210 is press-fitted onto the assembly part 110, a lower end portion of the first coupling portion 210 may be supported on an upper end of the flange 111 of the assembly part 110.

The second coupling portion 220 may be spaced a certain interval from the first coupling portion 210 and inserted into the assembly part 110 when the first coupling portion 210 is press-fitted onto the assembly part 110. Accordingly, the second coupling portion 220 may be provided to have a longer length than the length of the first coupling portion 210. In addition, since the second coupling portion 220 is disposed inside the assembly part 110, even when the dust cap 200 receives a load, the second coupling portion 220 is supported on an inner surface of the assembly part 110, thereby preventing the dust cap 200 from being tilted.

Meanwhile, when the second coupling portion 220 is assembled to the assembly part 110, a gap G (see FIG. 6) may be formed between the second coupling portion 220 and the inner surface of the assembly part 110. This is to easily couple the dust cap 200 to the assembly part 110 when the dust cap 200 is press-fitted into the assembly part 110. Here, the gap G between the second coupling portion 220 and the assembly part 110 represents a gap G formed between the second coupling portion 220 and the mounting portion 114 of the assembly part 110. As shown in the drawings, the mounting portion 114 is provided to protrude inward of the assembly part 110, and the second coupling portion 220 is formed to extend to a position at which the mounting portion 114 is formed such that the gap G is formed between the second coupling portion 220 and the mounting portion 114 for ease of assembly.

As described above, in the assembly structure of the dust cap according to the present disclosure, since the second coupling portion 220 of the dust cap 200 is press-fitted into the assembly part 110 to be disposed inside the assembly part 110, even when a load generated during driving of the vehicle is transmitted, it is possible to prevent the dust cap 200 from being tilted from the rack housing 100.

According to an embodiment of the present disclosure, the assembly structure of a dust cap may be provided to prevent tilting due to a load generated in the dust cap 200 and reduce squeak noise. Such an assembly structure of a dust cap is shown in FIGS. 7 and 8.

Figure 7:
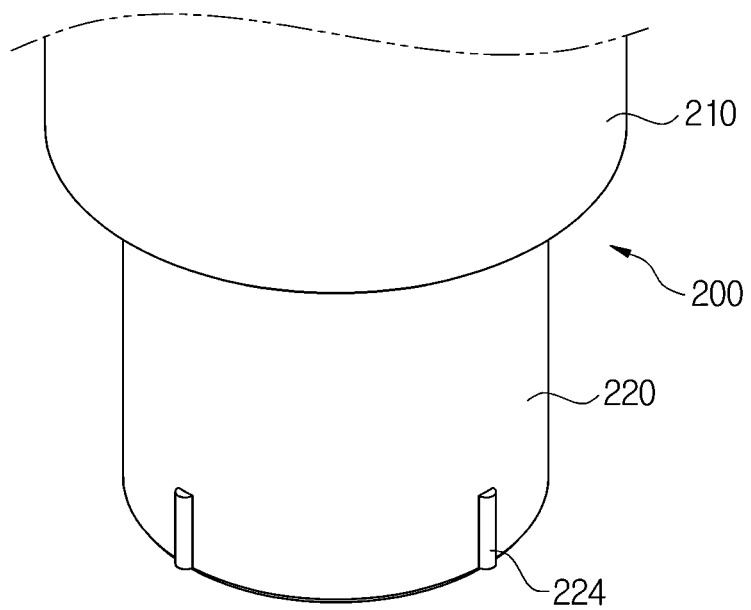
FIG. 7 is a perspective view illustrating a modified example of a second coupling portion provided in an assembly structure of a dust cap according to an embodiment of the present disclosure.

FIG. 7 is a perspective view illustrating a modified example of a second coupling portion provided in an assembly structure of a dust cap according to an embodiment of the present disclosure. FIG. 8 is a cross-sectional view illustrating the assembly structure of a dust cap of FIG. 7. Here, the same reference numerals as those shown above in the drawings denote members performing the same functions.

Figure 8:
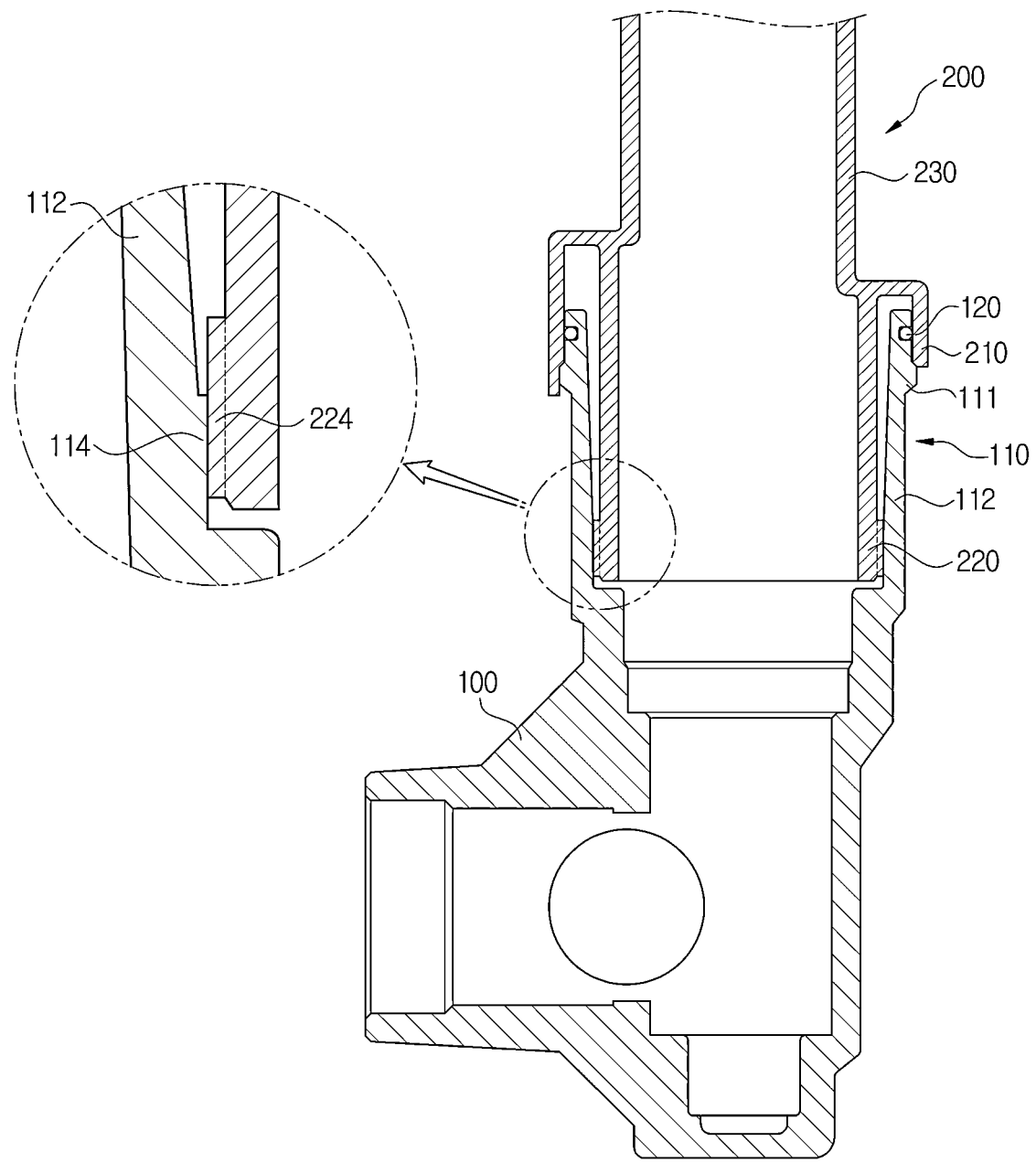
FIG. 8 is a cross-sectional view illustrating the assembly structure of a dust cap of FIG. 7.

Referring to FIGS. 7 and 8, a second coupling portion 220 of a dust cap 200 according to the present embodiment may further include ribs 224 protruding outward. That is, except that the ribs 224 are provided in the second coupling portion 220 of the dust cap 200, the rest of a structure is the same as a structure of the dust cap 200 of the above embodiment. In addition, an assembly part 110 of a rack housing 100 is also provided to have the same structure as that of the above embodiment.

The plurality of ribs 224 may be formed to extend in a longitudinal direction of the second coupling portion 220 and may be spaced a certain interval from each other along an outer circumferential surface of the second coupling portion 220. For example, four ribs may be provided to have a 90° phase difference, but the present disclosure is not limited thereto. The number of ribs may be optionally increased or decreased.

The rib 224 may be press-fitted onto an inner surface of the assembly part 110. That is, the rib 224 may be press-fitted into a mounting portion 114 of the assembly part 110. In this case, the rib 224 may be provided to have a thickness corresponding to an interval of a gap G between the assembly part 110 and the second coupling portion 220, but the present disclosure is not limited thereto.

In addition, the rib 224 may be provided to have a length corresponding to a length of the mounting portion 114, but the present disclosure is not limited thereto. For example, in order to reduce costs when the rib 224 is formed in the second coupling portion 220, the rib 224 may be provided to have the length corresponding to the length of the mounting portion 114. That is, in order to facilitate processing when the rib 224 is formed in the second coupling portion 220, the rib 224 may be provided to have a length corresponding to the second coupling portion 220.

According to the present embodiment, since the rib 224 of the second coupling portion 220 is press-fitted into the mounting portion 114 of the assembly part 110 to maintain a close contact state, even when a load is applied to the dust cap 200, it is possible to prevent tilting and prevent the occurrence of squeak noise with the assembly part 110.

Meanwhile, in order to make an assembled state of the dust cap 200 and the assembly part 110 of the rack housing 100 more stable, a locking protrusion 225 (see FIG. 9) may be further provided in the second coupling portion 220. Such a modified embodiment is shown in FIGS. 9 to 11.

Figure 9:
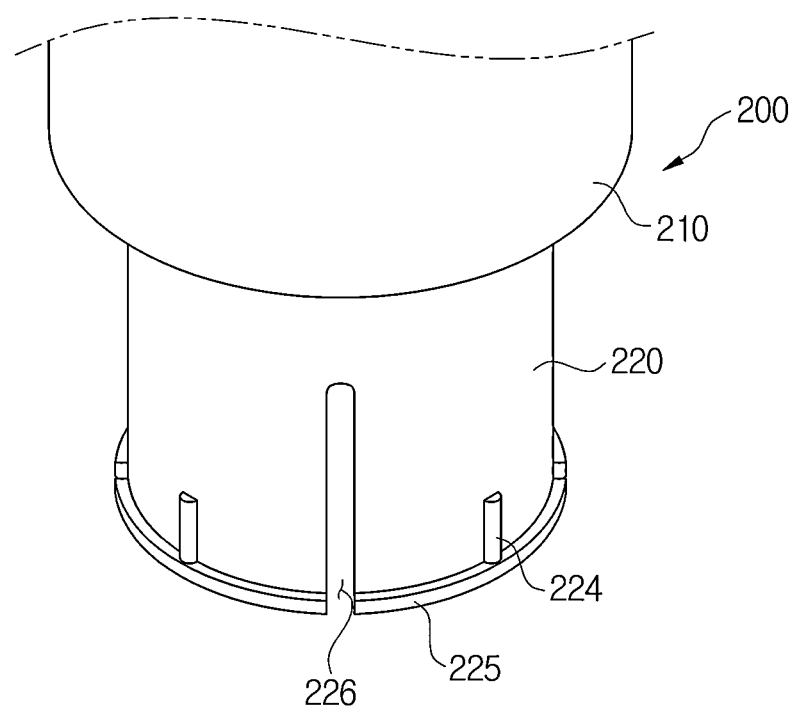
FIG. 9 is a perspective view illustrating another modified example of a second coupling portion provided in an assembly structure of a dust cap according to an embodiment of the present disclosure.

FIG. 9 is a perspective view illustrating another modified example of a second coupling portion provided in an assembly structure of a dust cap according to an embodiment of the present disclosure. FIG. 10 is a cross-sectional view illustrating an assembled state of a dust cap and a rack housing of FIG. 9. FIG. 11 is an assembly cross-sectional view of FIG. 10. Here, the same reference numerals as those shown above in the drawings denote members performing the same functions.

According to the present embodiment, a dust cap 200 may further include a locking protrusion 225 and a slit 226 formed in a second coupling portion 220, and an assembly part 110 may further include a locking groove 115 to which the locking protrusion 225 is inserted and coupled.

Figure 10:
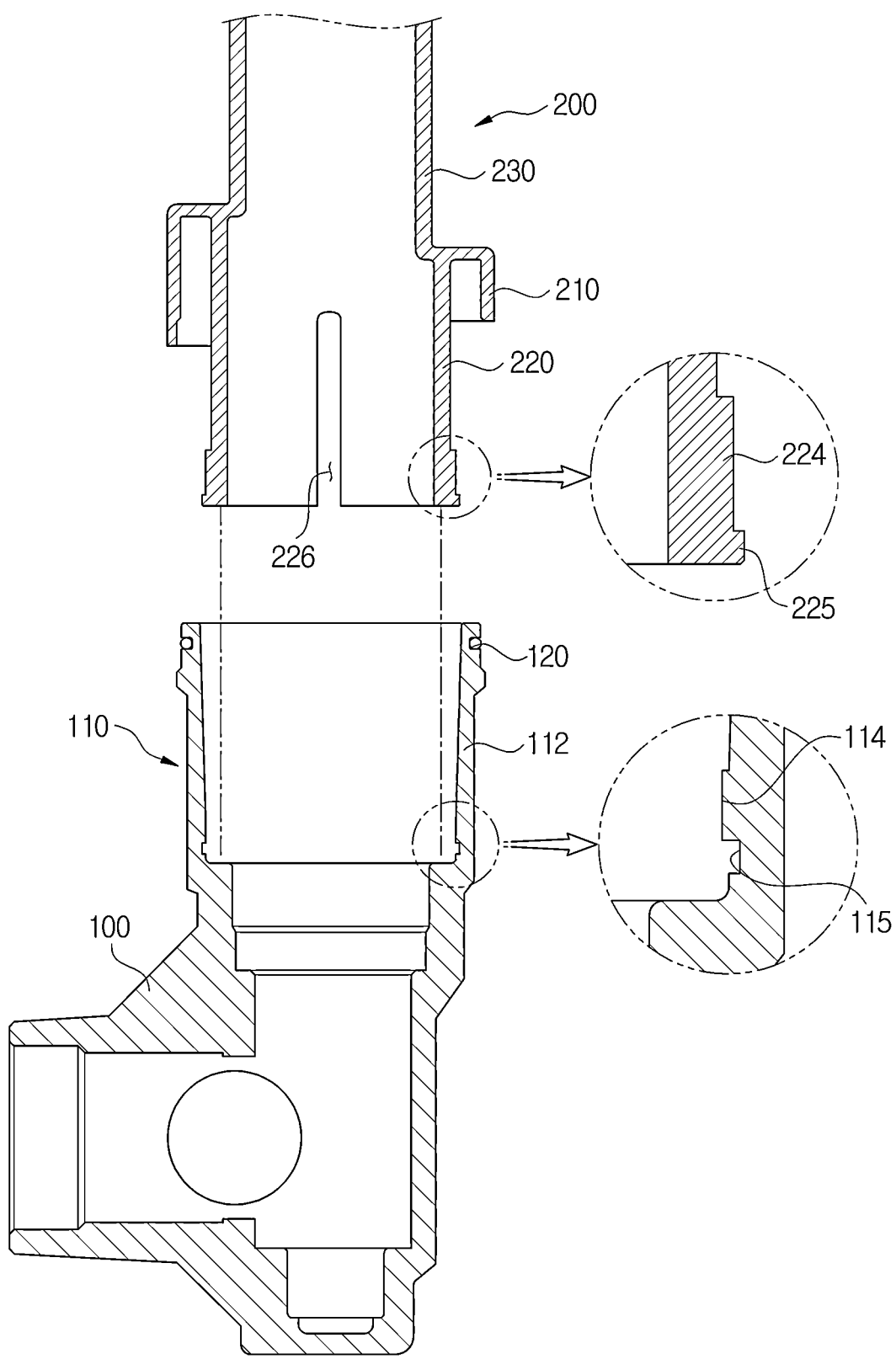
FIG. 10 is a cross-sectional view illustrating an assembled state of a dust cap and a rack housing of FIG. 9.
Figure 11:
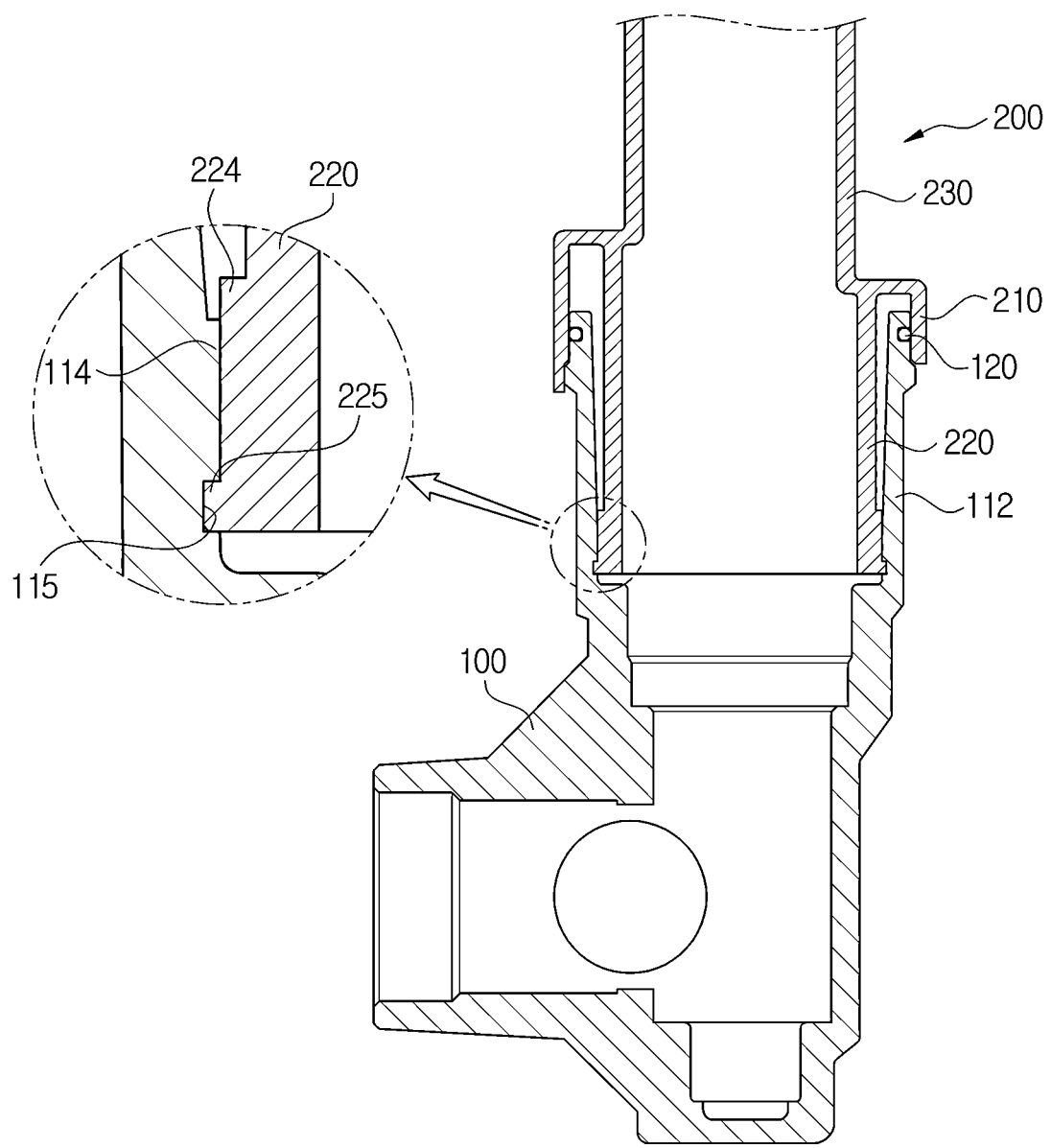
FIG. 11 is an assembly cross-sectional view of FIG. 10.

Referring to FIGS. 9 to 11, the locking protrusion 225 may protrude in an outer radial direction from an outer circumferential surface of the second coupling portion 220. Specifically, the locking protrusion 225 may be formed at a lower end portion of the second coupling portion 220. The locking protrusion 225 is formed to protrude further outward than a rib 224 protruding from the outer circumferential surface of the second coupling portion 220. That is, the locking protrusion 225 has an outer diameter that is greater than an inner diameter of a mounting portion 114. In order for the second coupling portion 220 to be assembled to the assembly part 110, the locking protrusion 225 should be provided to be positioned below the rib.

The slit 226 may be formed by cutting the second coupling portion 220 in a longitudinal direction thereof. A plurality of slits 226 may be formed along the outer circumferential surface of the second coupling portion 220 at certain intervals. In addition, the slit 226 may be formed by cutting the locking protrusion 225 along with the second coupling portion 220. The slit 226 allows the second coupling portion 220 to be elastically deformed when the locking protrusion 225 is assembled into the locking groove 115, thereby allowing the locking protrusion 225 to be easily assembled into the locking groove 115.

The locking groove 115 may be formed at a portion corresponding to the locking protrusion 225 when the second coupling portion 220 is assembled. That is, the locking groove 115 may be formed below the mounting portion 114.

When the dust cap 200 as described above is coupled to the assembly part 110, the locking protrusion 25 is provided to have a diameter that is greater than that of the mounting portion 114 so that a lower portion of the second coupling portion 220 is elastically deformed inward by the slit 226. Accordingly, the second coupling portion 220 passes through the mounting portion 114 to return to its original state, and the locking protrusion 225 is fitted into and coupled to the locking groove 115. In this case, the rib 224 is press-fitted into the mounting portion 114. Accordingly, the rib 224 of the second coupling portion 220 may be press-fitted into the mounting portion 114, and also the locking protrusion 225 is assembled into the locking groove 115 to maintain a strongly assembled state.

According to an embodiment of the present disclosure, although it is shown and described that the second coupling portion 220 is provided with the rib 224 or the locking protrusion 225 to be coupled to the assembly part 110, the present disclosure is not limited thereto. The dust cap 200 may be installed on the assembly part 110 to prevent tilting, and also, various structures capable of preventing noise may be applied. Such a modified embodiment is shown in FIGS. 12 to 14.

Figure 12:
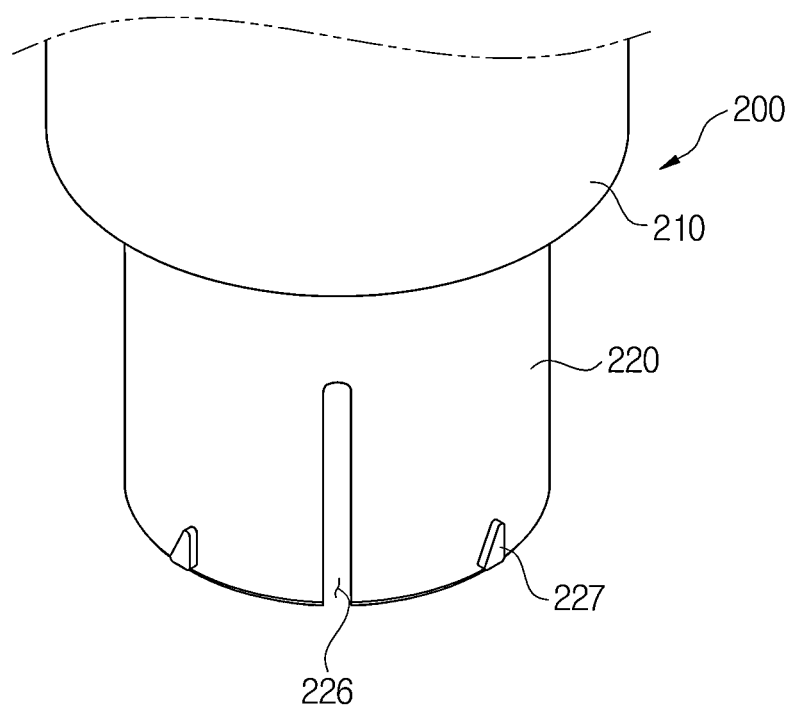
FIG. 12 is a perspective view illustrating still another modified example of a second coupling portion provided in an assembly structure of a dust cap according to an embodiment of the present disclosure.

FIG. 12 is a perspective view illustrating still another modified example of a second coupling portion provided in an assembly structure of a dust cap according to an embodiment of the present disclosure. FIG. 13 is a view illustrating an assembly part of a rack housing modified by a dust cap according to FIG. 12, and FIG. 14 is a view illustrating an assembled state of the dust cap and the rack housing shown in FIGS. 12 and 13. Here, the same reference numerals as those shown above in the drawings denote members performing the same functions.

According to the present embodiment, a dust cap 200 may include a tilt preventing protrusion portion 227 formed on a second coupling portion 220, and an assembly part 110 may include a tilt preventing groove portion 117.

Figure 13:
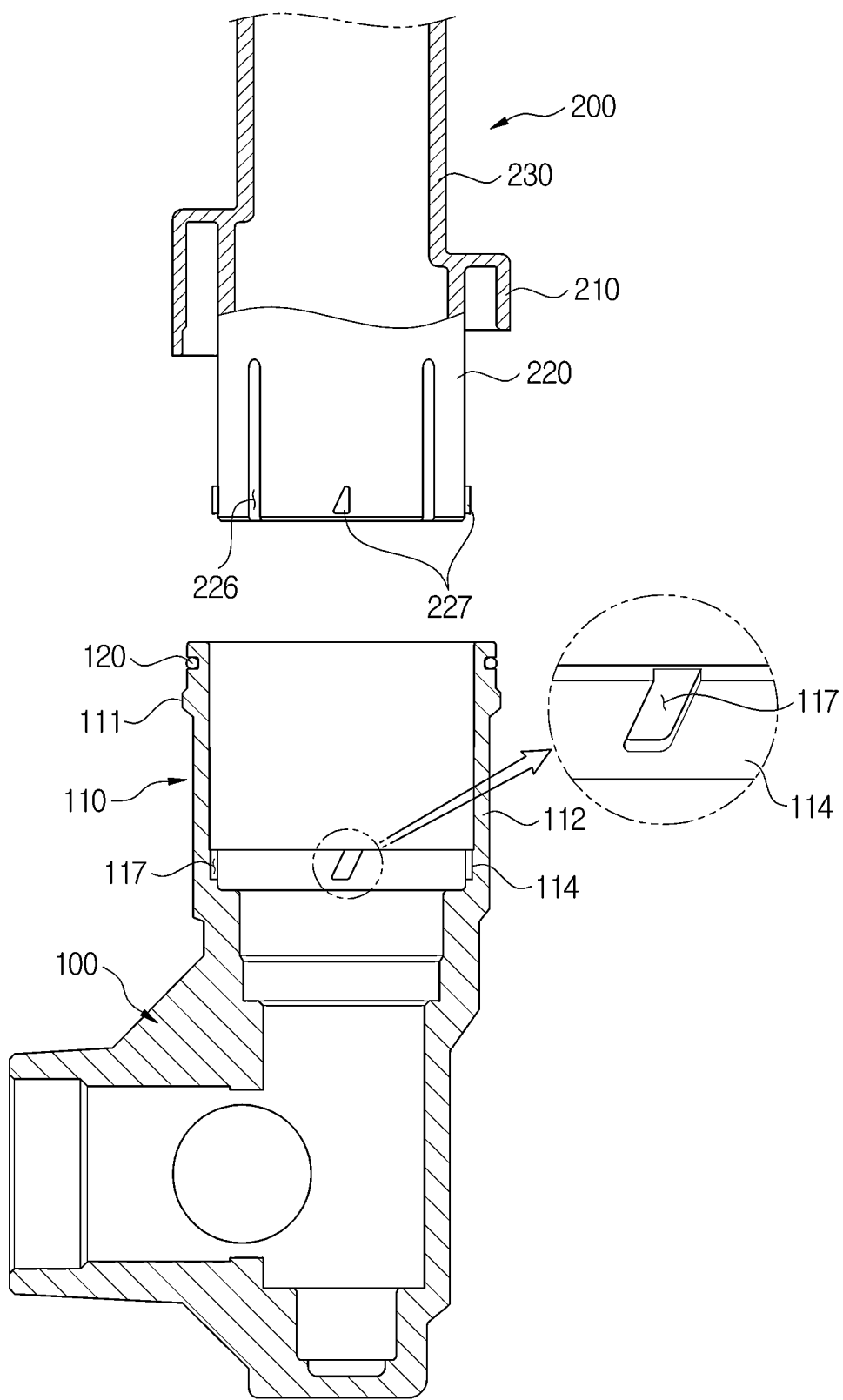
FIG. 13 is a view illustrating an assembly part of a rack housing modified by a dust cap according to FIG. 12.
Figure 14:
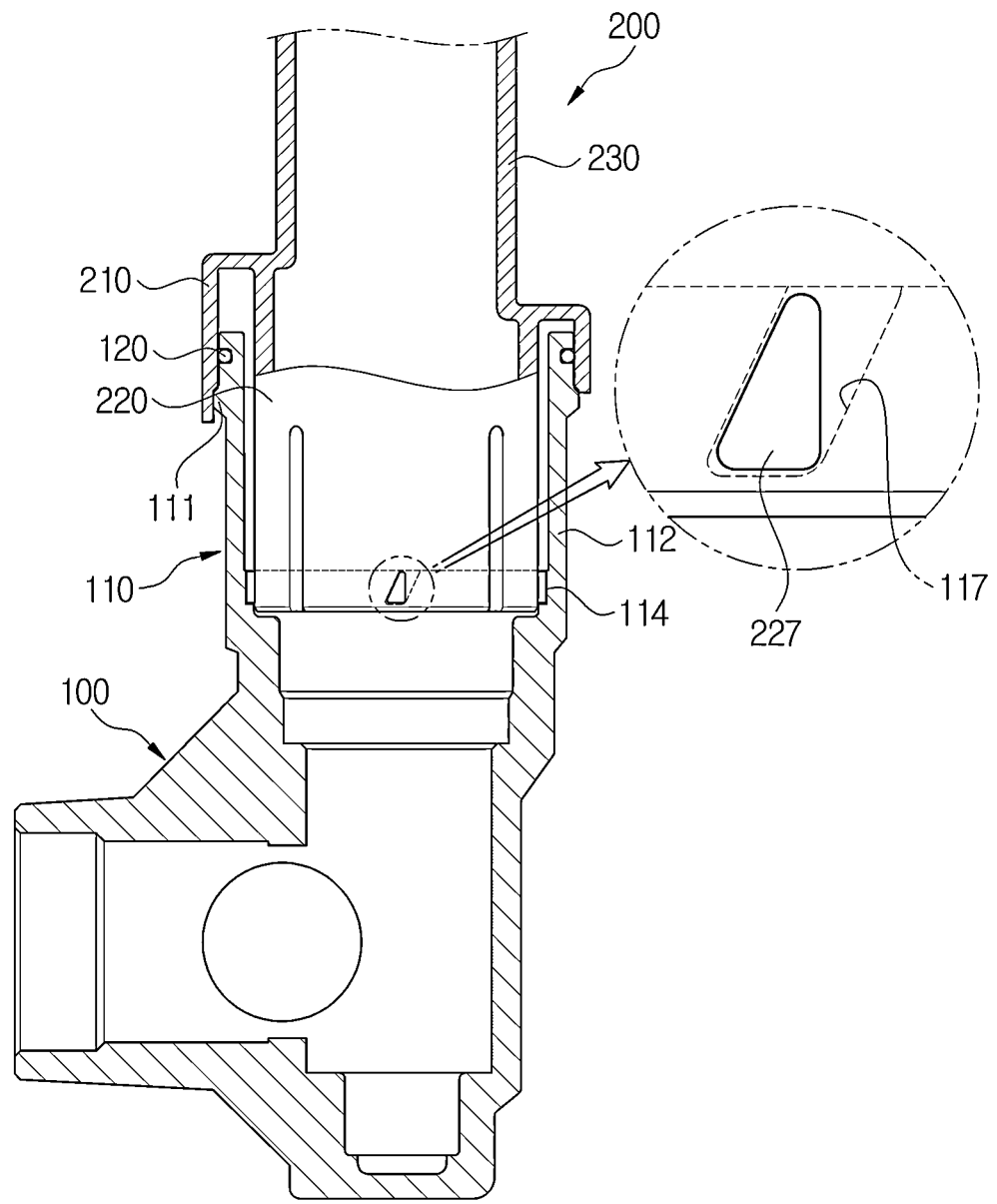
FIG. 14 is a view illustrating an assembled state of the dust cap and the rack housing shown in FIGS. 12 and 13.

Referring to FIGS. 12 to 14, the tilt preventing protrusion portion 227 may protrude in an outer radial direction from an outer circumferential surface of the second coupling portion 220. A plurality of tilt preventing protrusion portions 227 may be formed along the outer circumferential surface of the second coupling portion 220 at certain intervals. As shown in the drawings, the tilt preventing protrusion portion 227 is shown as having a substantially triangular shape, but the present disclosure is not limited thereto. The tilt preventing protrusion portion 227 may be provided in a polygonal shape, a circular shape, an elliptical shape, or the like.

The tilt preventing groove portion 117 is formed in a mounting portion 114 and may be formed at a portion corresponding to the tilt preventing protrusion portion 227 when the second coupling portion 220 is assembled. The tilt preventing groove portion 117 may be formed in any shape as long as the shape accommodates the tilt preventing protrusion portion 227 and a portion of the tilt preventing protrusion portion 227 is supported in surface contact therewith. That is, the tilt preventing groove portion 117 may not have the same shape as the tilt preventing protrusion portion 227. For example, the tilt preventing groove portion 117 may be provided as a groove having a substantially diamond shape. Accordingly, in a state in which the tilt preventing protrusion portion 227 having a triangular shape is fitted into the tilt preventing groove portion 117, the tilt preventing protrusion portion 227 is provided in a state in which a portion of an edge thereof is in close contact with the tilt preventing groove portion 117 and an outer surface thereof is in close contact with an inner surface of an assembly part 110, thereby preventing the dust cap 200 from being tilted from a rack housing 100 and preventing noise.

Meanwhile, in order to easily install the tilt preventing protrusion portion 227 in the tilt preventing groove portion 117, a slit 226 may be formed in the second coupling portion 220. This slit 226 is the same as that of the above embodiment, and thus a detailed description thereof will be omitted.

As described above, through various coupling structures of the dust cap 200 and the rack housing 100 according to the present embodiment, it is possible to prevent the dust cap 200 from being tilted from the rack housing 100 and also preventing squeak noise.

According to an assembly structure of a dust cap and a steering device including the same according to embodiments of the present disclosure, it is possible to prevent a dust cap from being tilted from a rack housing through a simple structure and also solve existing problems that a steering feeling is degraded, squeak noise occurs, and a gear is corroded due to inflow of foreign materials.

Although the present disclosure has been described through limited embodiments and drawings as described above, the present disclosure is not limited thereto and may be variously modified and changed by one of ordinary skill in the art without departing from the technical concept of the present disclosure and the scope of the following claims and equivalents thereof.

What is claimed is:

1. An assembly structure of a dust cap being coupled to an assembly part of a rack housing which is open such that a steering shaft is inserted therethrough,
   wherein:
   the dust cap includes
      a body provided in a hollow tube shape through which the steering shaft passes,
      a first coupling portion bent to extend outward from the body and press-fitted onto an outer circumferential surface of the assembly part, and
      a second coupling portion provided to be spaced a certain interval from the first coupling portion and inserted into the assembly part; and
   the second coupling portion is provided such that, when assembled to the assembly part, a gap is formed between the second coupling portion and an inner surface of the assembly part,
   the assembly part includes:
      an insertion portion provided such that an inner diameter thereof gradually decreases from an upper portion to a lower portion thereof; and
      a mounting portion extending vertically from a lower end of the insertion portion,
   the mounting portion is formed to protrude in an inner radial direction, and
   the second coupling portion further includes a rib formed to protrude outward.

2. The assembly structure of claim 1, wherein:
   the body, the first coupling portion, and the second coupling portion are integrally formed as one body; and
   the second coupling portion is provided to have a longer length than the length of the first coupling portion.

3. The assembly structure of claim 1, wherein:
   a sealing member is provided between the first coupling portion and the assembly part; and
   a sealing groove into which the sealing member is fitted is formed in the first coupling portion or the assembly part.

4. The assembly structure of claim 1, wherein the rib is provided to have a thickness corresponding to an interval of the gap so that the second coupling portion is press-fitted onto the inner surface of the assembly part.

5. The assembly structure of claim 1, wherein the rib is formed to extend in a longitudinal direction of the second coupling portion and provided as a plurality of ribs spaced a certain interval from each other along an outer circumferential surface of the second coupling portion.

6. The assembly structure of claim 1, wherein the rib is press-fitted into the mounting portion.

7. The assembly structure of claim 1, wherein the rib is provided to have a length corresponding to a length of the mounting portion.

8. The assembly structure of claim 1, wherein:
   the second coupling portion includes a locking protrusion in a radial direction from a lower end portion thereof; and
   the mounting portion has a locking groove which is formed at a portion corresponding to the locking protrusion and into which the locking protrusion is fitted and coupled when the second coupling portion is assembled.

9. The assembly structure of claim 8, wherein the second coupling portion has a slit formed by cutting the second coupling portion in a longitudinal direction thereof.

10. The assembly structure of claim 9, wherein the slit is formed by cutting the second coupling portion together with the locking protrusion.

11. The assembly structure of claim 9, wherein the slit is provided as a plurality of slits spaced a certain interval from each other along an outer circumferential surface of the second coupling portion.

12. The assembly structure of claim 1, wherein:
    the assembly part further includes a flange protruding from an outer surface thereof; and
    an upper end of the flange is provided to support a lower end of the first coupling portion.

13. The assembly structure of claim 12, wherein:
    the first coupling portion further includes an insertion protrusion at a lower edge thereof; and
    the flange has an insertion groove into which the insertion protrusion is inserted.

14. An assembly structure of a dust cap being coupled to an assembly part of a rack housing which is open such that a steering shaft is inserted therethrough,
    wherein:
    the dust cap includes
       a body provided in a hollow tube shape through which the steering shaft passes,
       a first coupling portion bent to extend outward from the body and press-fitted onto an outer circumferential surface of the assembly part, and
       a second coupling portion provided to be spaced a certain interval from the first coupling portion and inserted into the assembly part; and
    the assembly part includes
       an insertion portion provided such that an inner diameter thereof gradually decreases from an upper portion to a lower portion thereof; and
       a mounting portion extending vertically from a lower end of the insertion portion;
    the second coupling portion is provided such that, when assembled to the assembly part, a gap is formed between the second coupling portion and an inner surface of the assembly part;
    the second coupling portion further includes a tilt preventing protrusion portion formed to protrude outward; and
    the mounting portion has a tilt preventing groove portion into which the tilt preventing protrusion portion is inserted.

15. The assembly structure of claim 14, wherein the tilt preventing protrusion portion is provided as a plurality of tilt preventing protrusion portions spaced a certain interval from each other along an outer circumferential surface of the second coupling portion.

16. The assembly structure of claim 14, wherein:
    the tilt preventing protrusion portion is provided in a polygonal shape, a circular shape, or an elliptical shape; and the tilt preventing groove portion has a shape which accommodates the tilt preventing protrusion portion and in which a portion of the tilt preventing protrusion portion is supported in surface contact therewith.

17. A steering device comprising:
    a rack housing including an assembly part which is formed to extend upward from a body, in which a rack bar is accommodated, and is open such that a steering shaft is inserted therethrough; and
    an assembly structure of a dust cap coupled to the assembly part,
wherein:
    the dust cap includes
        a body provided in a hollow tube shape through which the steering shaft passes,
        a first coupling portion bent to extend outward from the body and press-fitted onto an outer circumferential surface of the assembly part, and
        a second coupling portion provided to be spaced a certain interval from the first coupling portion and inserted into the assembly part; and
    the second coupling portion is provided such that, when assembled to the assembly part, a gap is formed between the second coupling portion and an inner surface of the assembly part,
    the assembly part includes:
        an insertion portion provided such that an inner diameter thereof gradually decreases from an upper portion to a lower portion thereof; and
        a mounting portion extending vertically from a lower end of the insertion portion,
    the mounting portion is formed to protrude in an inner radial direction, and
    the second coupling portion further includes a rib formed to protrude outward.

* * * * *